Patented Feb. 23, 1954

2,670,343

UNITED STATES PATENT OFFICE 2,670,343

COMPLEX-FORMING CRYSTALLIZATION PROCESS

Lloyd C. Fetterly, Seattle, Wash., assignor to Shell Development Company, San Francisco, Calif., a corporation of Delaware No Drawing. Application March 12, 1948, Serial No. 14,643

10 Claims. (Cl. 260—96.5)

This invention is related to an improvement in a process for the formation of crystalline complexes. More particularly, it is directed to an improvement in the process for the formation of crystalline complexes between urea or its analogs with certain organic compounds.

The fractionation of mixtures of organic compounds may be effected by a number of different methods such as fractional distillation, fractional crystallization, selective adsorption and solvent extraction. The success of any one of these methods is dependent upon its applicability to a specific problem. Thus, where fractionation according to boiling point is desired, distillation is usually sufficient but only if other considerations, such as the types of organic compounds present, may be ignored. If a mixture of organic compounds, such as petroleum hydrocarbons, contains a variety of structural configurations which must be separated according to type the usual oil refinery distillation methods are of no utility. Such mixtures contain unbranched hydrocarbons, isoparaffins, olefins and naphthenes among others. Special processes have been devised for the separation of these types from one another for particular purposes.

A recent method for such fractionation is generally termed an "extractive fractionation process" or "extractive crystallization process." This comprises treating mixtures of organic compounds with a complex-forming agent which is specific in its action, forming crystalline complexes with only selected types of molecular structure which are present in the mixture to the exclusion of other types. It has been found, for example, that urea forms crystalline complexes with substantially unbranched hydrocarbons but that highly branched hydrocarbons and naphthenes will not form complexes with this agent. Other phenomena of this character will be described hereinafter.

In carrying out the extractive fractionation process, a solution of the complex-forming agent is usually contacted with the mixture of organic compounds to be fractionated. Such contact may take the form of stirring or other intimate mixing, usually at temperatures below about 75° C. It has been found that a period of apparent inactivity exists before crystalline complexes commence to form. Once the formation has started, however, it appears to proceed rapidly to completion. This inactive period will be called for convenience the "induction period." Dependent upon the conditions under which complex formation is attempted and upon the identity and concentration of the reactants present, this induction period may be of considerable length varying from a few minutes to as much as several days. Even with materials which are known to form complexes with unusual readiness the induction period may amount to as much as two to eight hours.

In the industrial application of this process the induction period becomes a matter of economic and technical concern. Extended induction periods increase the cost of the process and necessitate the use of storage facilities or other compartments where the reactants may be placed until crystallization commences. Extended residence periods necessarily reduce the efficiency of the process and diminish its applicability. Any means which may be devised for reducing the induction period to a minimum would be of substantial advantage in improving the process.

It is an object of the present invention to improve the extractive fractionation process. It is another object of this invention to diminish the induction period and to increase the rate at which complexes will be formed. Other objects will become apparent during the following discussion.

Now, in accordance with this invention, it has been found that the complex-forming agents may be activated so as to cause a substantial shortening of the induction period by heating them in the presence of a solvent therefor, prior to their use in the formation of crystalline complexes.

Still in accordance with this invention, it has been discovered that this heating may be carried out by two principal means: the agent may be dissolved or at least suspended in water and the mixture heated; or crystalline complexes of the agent may be heated in the presence of a solvent for the latter, causing decomposition of the complexes and consequent regeneration of the activated agent therefrom.

Again, in accordance with the present invention, it has been found that the degree of activation of the agent is roughly proportional to the extent of the heat treatment. In the case where the heat treatment forms a part of a complex decomposition, the degree of activation is somewhat proportional to the number of times the agent has been used in the formation of and regeneration from complexes.

The complex-forming agents to which the present process applies have the general configuration

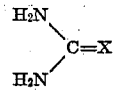

wherein X is an element selected from the right hand side of group VI of the periodic table and particularly those elements having a molecular weight less than 128. The agents thus especially included are urea, thiourea, selenourea, and tellurourea. Salts of these compounds are considered to be included in the above structural formula. Typical salts are the inorganic varieties such as the hydrochlorides or the organic series such as the acetates.

These complex-forming agents may be activated as indicated above by heating in the presence of a solvent for the agent. The heating may be carried out as a preliminary step to complex formation or, more preferably, it may constitute a part of the conditions employed in the destruction of complexes and consequent regeneration therefrom of a complex-forming agent which in turn may be utilized in the formation of additional complexes.

If new batches of complex-forming agents are to be activated they may be heated to a suitable temperature, preferably between about 45 and 90° C. for a period roughly varying from as little as 5 minutes to as much as 24 hours. Usually the time required for appreciable activation of the agent will be between 15 minutes and 3 hours, dependent upon the solvent which is present and the temperature of activation.

If the activation process is a part of a complex decomposing cycle, the solvent may be present in an amount sufficient to cause decomposition of the complex at the temperature employed. The solvent which is present may already contain a certain quantity of complex-forming agent. This would be particularly true if a solution of the agent which has been previously depleted in concentration by its use in a complex-forming system were employed as the decomposing solvent. In carrying out the latter process, which is preferred, the complexes are usually heated at a temperature of 45-90° C. in the presence of water or other solvent for a time sufficient to cause the complex to decompose. Decomposition of the complexes being considered results in the regeneration of the complex-forming agent and of the material which was in complex form therewith. The agent thereupon dissolves in the solvent which is present. The solution so formed may then be utilized in the formation of additional crystalline complexes.

It has been discovered, in accordance with this invention, that the degree of activation of the agent is roughly directly proportional to the number of cycles of the character described to which the agent has been subjected. Example I, presented hereinafter, shows striking support for the statement. Therein the original urea, which had not been heat treated, required a period of 3 hours to form crystalline complexes with a petroleum fraction. However, after the complexes so formed had been destroyed and the urea thus regenerated again contacted with a similar petroleum fraction a period of only 45 minutes was required for crystalline complex formation. After 4 such cycles the induction period was reduced to 10 minutes, or only $1/_{18}$ of the original induction period. It is immediately apparent from these figures that a cyclic process which re-uses the complex-forming agent becomes increasingly efficient as the agent is recycled.

The solvent to be employed in the activation process is preferably aqueous and, still more preferably, entirely composed of water. However, aqueous alcoholic solvents may be utilized. Other solvents, such as anhydrous alcohols, etc., may be used in place of aqueous media. While it is a preferred practice to use an amount of solvent at least sufficient to dissolve all of the complex-forming agent present, the heating of a slurry of the agent in a saturated solution thereof also causes its activation.

The temperature at which activation is carried out is preferably kept as low as commensurate with the rate of activation. This is advisable because certain solvents such as water cause decomposition of urea at elevated temperatures, with the resulting formation of ammonia and other decomposition products. If such products are formed it is a preferred additional step following the activation to remove the decomposition products by aeration, neutralization, or other means.

The agents form crystalline complexes with specific types of organic compounds, each agent having special characteristics in this regard. Urea has been found to form crystalline complexes with substantially unbranched hydrocarbons having from about 3 to over 50 carbon atoms in a straight chain.

Suitable hydrocarbons which form crystalline complexes with urea include, for example, the unbranched paraffins having at least about four carbon atoms, such as octane and hexadecane. Substantially unbranched olefins likewise are capable of complex formation. These are typified by 2-decene and 8-heptadecene. Diolefins such as 2,6-octadiene may be used, as well as unbranched hydrocarbons having a still greater degree of unsaturation.

Urea has been found to form crystalline complexes with substantially unbranched organic compounds containing oxygen such as alcohols, aldehydes, ketones and acids, especially the long chain fatty acids. Furthermore, urea will form crystalline complexes with heterocyclic oxygen compounds such as furan, halogenated compounds and acyclic nitrogen compounds, particularly the amines and the chlorinated hydrocarbons.

Thiourea has been found to form complexes with highly branched materials and naphthenes, especialy the isoparaffins.

The isoparaffins and iso-olefins containing two or more methyl side chains, such as 2,5-dimethyl octane, are particularly suitable, while those having other substituents, i. e. ethyl, propyl, etc., also may be used. Naphthenes forming thiourea complexes include the simple saturated cycloparaffins such as cyclohexane, as well as the substituted naphthenes such as 1,3-dimethyl cyclohexane.

Selenourea has been found to react with a wider variety of materials than either urea or thiourea and is used in special cases where rougher fractionation is satisfactory. These substances may be in admixture with each other and further diluted by the presence of other materials not specified above. The hydrocarbons have been found to form complexes with these particular agents with especial ease and hence are a preferred group of substances to be treated by the process of the present invention.

In carrying out the process of the present invention according to its preferred form the following steps or their equivalents are utilized: The complex-forming agent, preferably in the form of a solution, is contacted by rapid stirring with the mixture of organic compounds to be fractionated. The stirring is conducted at least until crystalline complexes commence to form. Once the complexes have started to form the reaction proceeds rapidly to completion, usually within a period of several minutes at most. The crystalline complexes thus formed are present as a slurry in admixture with the remaining solution of the agent and the remaining fractions of the original mixture of organic compounds. This slurry may be separated by such means as filtration or centrifuging. The crystalline complexes are thus isolated from the now depleted solution of the agent and the remaining mixture of the organic compounds. These latter two phases are separated from one another, following which the dilute solution of the agent is contacted with the crystalline complexes. The mixture is warmed to a temperature between about 45 and 90° C. and the complexes gradually decompose. The agent which is thus regenerated dissolves in the solvent which is present and the regenerated organic compounds may be separated therefrom. This heating period in the presence of the dilute solution of the agent constitutes an activation period for the regenerated agent. The solution of the agent thus formed is recycled to be used in the formation of further quantities of crystalline complexes. It will be found that the induction period now required is considerably less than that initially necessary. This cycle may be repeated as often as desired.

The above described procedure comprising, the contacting of a mixture containing straight chain organic compounds with an aqueous or aqueous-alcoholic solution of urea to form complexes of urea and straight chain compounds, separation of the complexes from organic compounds which did not form complexes, heating of the complexes in the presence of depleted or dilute solution of urea to decompose the complexes, thus liberating the complexed organic compounds and reinforcing or reconstituting the solution of urea, followed by separation of the reconstituted solution and recycle of the same for use in further treatment of mixtures of organic compounds, is described in my copending application Serial No. 720,679, filed January 7, 1947, now abandoned. The same procedure, including the use of solutions of thiourea for forming complexes with non-straight chain organic compounds, is described in my copending application Serial No. 730,182, filed February 21, 1947, issued as Patent No. 2,499,820 on March 7, 1950.

The crystalline complexes formed in accordance with this process appear to depend upon some form of hydrogen bonding. The ease with which the complexes decompose and the fact that complexes usually contain about one molecule of the agent for each carbon atom of the organic compound in complex form therewith are in accordance with this theory.

The formation of the crystalline complexes also may be effected by passing a gaseous mixture of the organic materials through a bed of the solid complex forming agent or through a solution thereof. More preferably, however, a solution of the mixture is contacted with a solution of the agent. Inert diluents such as pentane and methyl isobutyl ketone may be used, care being taken that the diluent employed does not form complexes with the agent under the conditions utilized.

The complexes may be decomposed as described above by heating with a solvent for the agent. Other decomposition means include heating with a solvent for the organic compound, steam distillation or heating in the presence of a hot dry gas such as nitrogen. The following example describes a particular embodiment of the present invention:

Example

A mixture of 5 parts of methanol with 1 part of water was saturated with urea at 100° F. A petroleum oil fraction boiling between 415° F. and 660° F. was diluted with an equal volume of methyl isobutyl ketone. Two parts of the diluted oil and 5 parts of the urea solution were shaken at 75° F. until crystalline complexes formed between urea and substantially unbranched hydrocarbons forming part of the petroleum oil.

The complexes were filtered off and heated at 140° F. with water until they decomposed, the urea so regenerated dissolving in the water while the regenerated hydrocarbons formed a separate layer.

The urea so recovered was employed in repeating the process described above, and was thus reused for 4 complex formations, consequently passing through three complex decomposition cycles. The period necessary for the complex to commence to form was noted each time, the data so obtained being given in the table below:

|  | Minutes Required for Reaction to Commence |
|---|---|
| 1st Formation | 180 |
| 2nd Formation | 45 |
| 3rd Formation | 20 |
| 4th Formation | 10 |

I claim as my invention:

1. A process for the separation of straight chain hydrocarbons from a mixture thereof with non-straight chain hydrocarbons which comprises contacting said mixture with an aqueous solution of urea at a temperature below 75° C. to form a solid phase consisting of crystalline molecular complexes of urea with straight-chain hydrocarbons, an aqueous phase consisting of a dilute aqueous solution of urea and a non-straight chain hydrocarbon phase; separately recovering said phases; admixing the dilute urea solution with said crystalline complexes; heating said admixture to a temperature between about 45° and 90° C. whereby the complexes are decomposed to liberate urea and straight chain hydrocarbons and whereby the dilute urea solution is reinforced with said liberated urea; separating the reinforced urea solution from the straight chain hydrocarbons and recycling the reinforced urea solution for treatment of further quantities of the original hydrocarbon mixture.

2. A process for the separation of branched chain and naphthenic hydrocarbons from mixtures thereof with straight chain hydrocarbons which comprises contacting said mixture with an aqueous solution A of thiourea at a temperature below 75° C. to form a solid phase consisting of crystalline molecular complexes of thiourea with branched chain and naphthenic hydrocarbons, an aqueous phase which is an aqueous solution B of thiourea having a lower thiourea concentration than aqueous solution A, and a straight chain hydrocarbon phase; separately recovering said phases; admixing the aqueous thiourea solution B with said crystalline complexes; heating said admixture to a temperature of from about 45° C. to about 90° C. and to a temperature higher than that at which said crystalline complexes are formed, whereby the complexes are decomposed to liberate thiourea and branched chain and naphthenic hydrocarbons and whereby the aqueous thiourea solution B is reinforced with the thus liberated thiourea to regenerate aqueous thiourea solution A; separating the regenerated aqueous solution A from the branched chain and naphthenic hydrocarbons; and recycling said regenerated thiourea solution A for treatment of further quantities of the original hydrocarbon mixture.

3. In the process for the separation of straight chain organic compounds from mixtures thereof with non-straight chain organic compounds wherein said mixture is contacted with an aqueous solution A of urea at a temperature below about 75° C. whereby crystalline molecular complexes of urea with straight-chain organic compounds are formed and whereby an aqueous solution B of urea having a lower urea concentration than aqueous solution A is formed, and wherein the crystalline complexes are separated from the non-straight chain organic compounds, the improvement which comprises the steps of decomposing said crystalline molecular complexes by heating said complexes, in the presence of said aqueous urea solution B, to a temperature of from about 45° C. to 90° C. and to a temperature higher than that at which said crystalline complexes are formed, whereby the complexes are decomposed to liberate urea and straight chain organic compounds and whereby the aqueous urea solution B is reinforced with the thus liberated urea to regenerate aqueous urea solution A, separating the regenerated aqueous urea solution A from the straight-chain organic compounds and recycling said regenerated urea solution A for treatment of further quantities of the original mixture.

4. In a process for separating a mixture of organic compounds, said mixture containing as a fraction thereof an organic compound selected from the group consisting of straight chain, branched chain, and naphthenic organic compounds wherein said mixture is contacted with a solution A of a complex-forming agent of the group consisting of urea and thiourea at a temperature below about 75° C. so as to form crystalline molecular complexes of the group consisting of urea-straight chain organic compounds, thiourea-branched chain organic compounds, and thiourea-naphthenic organic compounds, and wherein the crystalline molecular complexes are separated from uncomplexed organic compounds, the improvement which comprises decomposing said crystalline molecular complexes by heating said complexes, in the presence of a solution B of complex-forming agent having a lower concentration of complex-forming agent than solution A and which is reduced in concentration by use in previous complex formation, to a temperature of from about 45° C. to about 90° C. and to a temperature higher than that at which said crystalline molecular complexes are formed, whereby said complexes are decomposed to liberate the complex-forming agent and the organic compounds associated therewith, and whereby the solution B of complex-forming agent is reinforced with the thus liberated complex-forming agent, separating the reinforced solution of complex-forming agent from the liberated organic compounds, and recycling said reinforced solution for treatment of further quantities of the original mixture.

5. In a process for separating a mixture of hydrocarbons, said mixture containing as a fraction thereof at least one hydrocarbon selected from the group consisting of straight chain, branched chain, and naphthenic hydrocarbons wherein said mixture is contacted with an aqueous solution A of a complex-forming agent selected from the group consisting of urea and thiourea at a temperature below about 75° C. so as to form crystalline molecular complexes of the group consisting of urea-straight chain hydrocarbon, thiourea-branched chain hydrocarbons, and thiourea-naphthenic hydrocarbons, and wherein the crystalline molecular complexes are separated from uncomplexed hydrocarbons, the improvement which comprises decomposing said crystalline molecular complexes by heating said complexes, in the presence of an aqueous solution B of complex-forming agent having a lower concentration of complex-forming agent than solution A and which is reduced in concentration by use in previous complex formation, to a temperature of from about 45° C. to about 90° C. and to a temperature higher than that at which said crystalline molecular complexes are formed, whereby said complexes are decomposed to liberate the complex-forming agent and the hydrocarbons associated therewith, and whereby the aqueous solution B of complex-forming agent is reinforced with the thus liberated complex-forming agent, separating the reinforced aqueous solution of complex-forming agent from the liberated hydrocarbons, and recycling said reinforced aqueous solution for treatment of further quantities of the original mixture.

6. A process for separating straight chain and non-straight chain hydrocarbons from mixtures which comprises contacting the mixture with an aqueous solution of a complexing agent selected from the group consisting of urea and thiourea to form a solid phase consisting of crystalline molecular complexes of hydrocarbons and complexing agent, an aqueous phase consisting of a dilute aqueous solution of complexing agent and a liquid hydrocarbon phase, separately recovering said phases; admixing the dilute aqueous solution with said crystalline complexes; heating said admixture to a temperature at which the complexes are decomposed to liberate the complexing agent and hydrocarbons and the dilute aqueous solution is reinforced with said liberated complexing agent; separating the reinforced aqueous solution of complexing agent from the hydrocarbons and recycling the said reinforced solution for treatment of further quantities of the original hydrocarbon mixture.

7. A process for separating a mixture of organic compounds said mixture containing as a fraction thereof an organic compound selected from the group consisting of straight chain, branched chain, and naphthenic organic compounds which comprises contacting the mixture with a solution of a complex forming agent of the group consisting of urea and thiourea to form a solid phase consisting of crystalline molecular complexes of the group consisting of urea-straight chain organic compounds, thiourea-branched chain organic compounds, and thiourea-naphthenic organic compounds, an aqueous phase consisting of a dilute aqueous solution of complexing agent and a liquid organic compound phase, separately recovering said phases; admixing the dilute aqueous solution with said crystalline complexes; heating said admixture to a temperature at which the complexes are decomposed to liberate the complexing agent and organic compound and the dilute aqueous solution is reinforced with said liberated complexing agent; separating the reinforced aqueous solution of complexing agent from the organic compounds and recycling the said reinforced solution for treatment of further quantities of the original organic mixture.

8. A process for separating a mixture of organic compounds, said mixture containing as a fraction thereof an organic compound selected from the group consisting of straight chain, branched chain, and naphthenic organic compounds which comprises contacting the mixture with an aqueous solution A of a complexing agent selected from the group consisting of urea and thiourea to form a solid phase consisting of crystalline molecular complexes of organic compounds and complexing agent, separating the crystalline molecular complexes from uncomplexed organic compounds, decomposing said crystalline molecular complexes by heating in the presence of a solution B of the complex forming agent, said solution having a lower concentration of complex-forming agent than solution A and is reduced in concentration by use in previous complex formation, to a temperature at which the complexes are decomposed to liberate the complexing agent and organic compound and the dilute aqueous solution is reinforced with said liberated complexing agent, separating the reinforced aqueous solution of complexing agent from the organic compounds and recycling the said reinforced solution for treatment of further quantities of the original organic mixture.

9. A process for the separation of branched chain and naphthenic hydrocarbons from mixtures thereof with straight chain hydrocarbons which comprises contacting said mixture with an aqueous solution A of thiourea to form a solid phase consisting of crystalline molecular complexes of hydrocarbons and thiourea, an aqueous phase consisting of a dilute aqueous solution of thiourea and a liquid hydrocarbon phase, separately recovering said phases; admixing the dilute aqueous solution with said crystalline complexes; heating said admixture to a temperature at which the complexes are decomposed to liberate the thiourea and hydrocarbons, whereby the dilute aqueous solution is reinforced with said liberated thiourea; separating the reinforced aqueous solution of complexing agent from the hydrocarbons and recycling the said reinforced solution for treatment of further quantities of the original hydrocarbon mixture.

10. A process for separating a mixture of organic compounds, said mixture containing as a fraction thereof at least one organic compound selected from the group consisting of straight chain, branched chain, and naphthenic organic compounds which comprises contacting the mixture with a solution A of a complex-forming agent of the group consisting of urea and thiourea to form a solid phase consisting of crystalline molecular complexes of organic compounds and complexing agent, separating the crystalline molecular complexes from uncomplexed organic compounds; admixing the complexes with a solution B of the complex-forming agent, said solution having a lower concentration of agent than original solution A and is reduced in concentration by previous complex formation; heating the mixture to a temperature at which the complexes are decomposed to liberate the complex forming agent and organic compound, and solution B is reinforced with said liberated complex-forming agent, separating the reinforced solution from the organic compounds and recycling the reinforced solution for treatment of further quantities of the original mixture.

LLOYD C. FETTERLY.

References Cited in the file of this patent

UNITED STATES PATENTS

| Number | Name | Date |
|---|---|---|
| 2,295,606 | Riethof | Sept. 15, 1942 |
| 2,300,134 | Priewe | Oct. 27, 1942 |
| 2,376,008 | Riethof | May 15, 1945 |

OTHER REFERENCES

Bengen: Bibliography of Scientific and Industrial Repts., Office of the Publication Board, vol. 1, No. 4, page 101, PB1742, February 1, 1946.

Technical Oil Mission, Reel 143, translation by Shell Development Co. of German application B190,197 (Bengen) deposited in Library of Congress May 22, 1946, (included in Index released May 31, 1946). Copy available in Library of Congress (5 pages, 2–6 inclusive only).